United States Patent
O' Ryan

(10) Patent No.: US 11,162,688 B2
(45) Date of Patent: Nov. 2, 2021

(54) THERMALLY INSULATING GLASS LAMINATES WITH A PLURALITY OF GLASS SPACERS SUBMERGED IN A COATING LAYER TO FORM A SEALED CAVITY OF GAS MOLECULES

(71) Applicant: Schott Gemtron Corp., Sweetwater, TN (US)

(72) Inventor: Adam O' Ryan, Sweetwater, TN (US)

(73) Assignee: SCHOTT GEMTRON CORP., Sweetwater, TN (US)

( * ) Notice: Subject to any disclaimer, the term of this patent is extended or adjusted under 35 U.S.C. 154(b) by 384 days.

(21) Appl. No.: 15/425,694

(22) Filed: Feb. 6, 2017

(65) Prior Publication Data

US 2018/0224131 A1     Aug. 9, 2018

(51) Int. Cl.
| | |
|---|---|
| B32B 15/04 | (2006.01) |
| F24C 15/04 | (2006.01) |
| B32B 17/10 | (2006.01) |

(52) U.S. Cl.
CPC ........ *F24C 15/04* (2013.01); *B32B 17/10036* (2013.01); *B32B 17/10165* (2013.01); *B32B 2307/304* (2013.01)

(58) Field of Classification Search
CPC ........ B32B 17/10165; B32B 2307/304; B32B 17/10036
USPC .................. 428/34, 425.6, 428, 426, 432
See application file for complete search history.

(56) References Cited

U.S. PATENT DOCUMENTS

| | | | |
|---|---|---|---|
| 5,315,797 A | 5/1994 | Glover et al. | |
| 5,337,727 A | 8/1994 | Borens et al. | |
| 5,588,421 A | 12/1996 | Busch et al. | |
| 5,891,536 A * | 4/1999 | Collins | ............... E06B 3/66304 428/34 |
| 6,049,370 A * | 4/2000 | Smith, Jr. | ........... G02F 1/13394 349/156 |

(Continued)

FOREIGN PATENT DOCUMENTS

| | | |
|---|---|---|
| CN | 103172255 | 6/2013 |
| DE | 19906774 | 8/2000 |

(Continued)

OTHER PUBLICATIONS

International Search Report dated Apr. 24, 2018 for corresponding PCT/US2018/016885, 2 pages.

(Continued)

*Primary Examiner* — Lauren R Colgan

(74) *Attorney, Agent, or Firm* — Ohlandt, Greeley, Ruggiero & Perle, L.L.P.

(57) ABSTRACT

The present disclosure describes thermally insulating glass laminates that prevent heat from escaping from heated cavities. In some embodiments, the thermally insulating glass laminates comprise a low or non-conductive coating layer that forms a chemical bond with at least one substrate, wherein the coating layer has a thickness of about 0.010 inches or less, wherein a plurality of glass spacers is submerged in the coating layer, and wherein at least one sealed cavity of gas molecules is created between the substrates and around the glass spacers. Since there is a small amount of gas molecules in each cavity, convective heat transfer between the substrates is minimized thereby minimizing heat loss through the laminates into the surrounding environment.

27 Claims, 2 Drawing Sheets

(56) References Cited

U.S. PATENT DOCUMENTS

| | | | |
|---|---|---|---|
| 6,291,036 B1* | 9/2001 | Wang | C03B 27/00 |
| | | | 428/34 |
| 6,326,067 B1* | 12/2001 | Veerasamy | E06B 3/6612 |
| | | | 428/34 |
| 6,404,532 B1* | 6/2002 | Berneth | G02F 1/161 |
| | | | 359/265 |
| 6,444,281 B1* | 9/2002 | Wang | E06B 3/66304 |
| | | | 428/34 |
| 6,497,931 B1* | 12/2002 | Aggas | E06B 3/66304 |
| | | | 428/34 |
| 6,693,261 B2 | 2/2004 | Leutner | |
| 6,701,749 B2 | 3/2004 | Wang | |
| 6,946,171 B1 | 9/2005 | Aggas | |
| 8,154,200 B2* | 4/2012 | Hunze | H01L 51/5246 |
| | | | 313/512 |
| 10,988,973 B2* | 4/2021 | Uriu | B32B 3/18 |
| 2004/0146721 A1 | 7/2004 | Hartig | |
| 2004/0164075 A1* | 8/2004 | Henze | F24C 15/04 |
| | | | 219/740 |
| 2005/0194086 A1 | 9/2005 | Abate | |
| 2008/0245011 A1 | 10/2008 | Friedl | |
| 2009/0311449 A1* | 12/2009 | Fehlmann | B32B 17/10 |
| | | | 428/34 |
| 2011/0296771 A1 | 12/2011 | Miller | |
| 2012/0060822 A1 | 3/2012 | Eberhard | |
| 2013/0081610 A1* | 4/2013 | Eichelberger | F24C 15/008 |
| | | | 126/273 R |
| 2013/0142972 A1 | 6/2013 | Raggio | |
| 2015/0327333 A1 | 11/2015 | Lecomte | |
| 2015/0376935 A1 | 12/2015 | Greiner | |
| 2016/0138324 A1 | 5/2016 | Lameris et al. | |

FOREIGN PATENT DOCUMENTS

| | | |
|---|---|---|
| FR | 2484397 | 12/1981 |
| GB | 2531548 | 4/2016 |
| WO | 0129357 | 4/2001 |
| WO | 03104599 | 12/2003 |
| WO | 2010132057 | 11/2010 |

OTHER PUBLICATIONS

Written Opinion of the International Searching Authority dated Apr. 24, 2018 for corresponding PCT/US2018/016885, 5 pages.
International Preliminary Report on Patentability dated Aug. 9, 2019 for corresponding PCT/US2018/016885, 6 pages.

* cited by examiner

THERMALLY INSULATING GLASS LAMINATES WITH A PLURALITY OF GLASS SPACERS SUBMERGED IN A COATING LAYER TO FORM A SEALED CAVITY OF GAS MOLECULES

BACKGROUND OF THE DISCLOSURE

1. Field of the Disclosure

The present disclosure relates to thermally insulating glass laminates.

2. Description of the Related Art

Glass laminates are used in high temperature applications as windows and sight glasses for the purpose of viewing a heated cavity. To minimize heat loss from the cavity, the laminates have multiple panes of glass with a gap between the panes to prevent direct heat transfer from the cavity to the outer pane, but the temperature of the outer pane still increases and heat escapes into the surrounding environment because of convective heat transfer through air in the gap between the panes. Heat insulating coatings have been used to prevent heat loss but many coatings are inadequate.

SUMMARY OF THE DISCLOSURE

The present disclosure describes thermally insulating glass laminates that prevent heat from escaping from heated cavities. In some embodiments, the thermally insulating glass laminates comprise a low or non-conductive coating layer that forms a chemical bond with at least one inner surface of the substrates, where the coating layer can have a thickness of about 0.010 inches or less, and where a plurality of glass spacers is submerged in the coating layer. This arrangement creates at least one sealed three-dimensional cavity of gas molecules that exists between the substrates and around the glass spacers with a small amount of gas molecules therein. Since there is a small amount of gas molecules in the cavity, convective heat transfer between the substrates is minimized thereby minimizing heat loss through the laminates and into the surrounding environment.

Some current thermally insulating glass laminates are optimal insulators when the gas cavity has a thickness of about 15 millimeters, where thinner cavities have increased conduction losses and thicker cavities have increased convection losses. This knowledge suggests that decreasing the thickness of the cavity would increase conduction losses, but conduction losses are not increased in the current disclosure.

The thermally insulating glass laminates of the disclosure can be used for non-limiting example in high temperature applications such as windows and sight glasses in residential and commercial ovens and applications having heated cavities where low heat loss and cool outlet window temperatures are desired. In some embodiments, the high temperature applications are above about 175° C.

In one embodiment, the present disclosure provides a thermally insulating laminate comprising a first glass substrate having an inner surface, a second glass substrate having an inner surface; and a low or non-conductive coating layer that forms a chemical bond with at least one inner surface. The coating layer has a thickness of about 0.010 inches or less. A plurality of glass spacers is submerged in the coating layer. At least one sealed cavity of gas molecules is created between the substrates and around a portion of the glass spacers not submerged in the coating layer.

DETAILED DESCRIPTION OF THE DISCLOSURE

Figure 1:
FIG. 1 is an SEM image of a plurality of glass spheres submerged in the coating layer.

The present disclosure describes thermally insulating glass laminates that prevent heat from escaping from heated cavities. In some embodiments, the thermally insulating glass laminates comprise a first glass substrate having an inner surface, a second glass substrate having an inner surface, and a low or non-conductive coating layer that forms a chemical bond with at least one inner surface, wherein the coating layer has a thickness of about 0.010 inches or less, wherein a plurality of glass spacers is submerged in the coating layer, and wherein at least one sealed cavity of gas molecules is created between the substrates and around the glass spacers.

The glass spacers may comprise without limitation about 100 to about 700, or about 400 spacers per square millimeter of the coating layer. The spacers can have a width of about 10 to about 50 microns. The glass spacers should prevent the substrates from touching. The glass spacers should be submerged in the coating layer without contacting the substrates to minimize conductive heat transfer through the glass spacers, but if the glass spacers do contact one of more of the substrates, the glass spacers should only contact the substrates at tangent points of the glass spacers. The term "submerged" means that a portion of the height of the glass spacers, such as for non-limiting example about ⅓ or less, is embedded within or in contact with the coating layer for purposes of bonding the glass spacers to the coating layer, while the remainder of the height of the glass spacers, such as for non-limiting example the remaining about ⅔ or more, protrudes above the coating layer to contact the other substrate or a layer therebetween. The sealed cavities are created between the substrates and "around" the portion of the glass spacers that are not submerged in the coating layer. That is, the cavities are bounded by an inner surface of substrates, the spacers, and the coating layer, in which a portion of the spacers are submerged.

The glass spacers may be solid or hollow and may comprise without limitation glass spheres, glass columns, glass filaments, any other glass shapes, and any combination thereof. One of the purposes of the glass spacers is to provide a gap between the substrates to trap gas molecules in at least one sealed cavity created between the substrates and around the glass spacers or between the coating layer, the opposite substrate or layer therebetween, and around the glass spacers. Since the glass spacers might contact at least one substrate, the glass spacers should comprise a material having a low or non-conductivity. The glass spacers in some embodiments have a height that is greater than the thickness of the coating layer so that the glass spacers protrude from the coating layer to help form at least one sealed cavity of gas molecules around the glass spacers and between the substrates or the layers therebetween. In some embodiments, the glass spacers contact one or more of the substrates or layers therebetween. In some embodiments, the height of the glass spacers is at least twice the thickness of the coating layer.

The glass spacers in some embodiments are submerged in about 30% or less of the surface area of the coating layer, about 20% or less of the surface area of the coating layer, about 10% of less of the surface area of the coating layer, or about 5% or less of the surface area of the coating layer. In other words, the coating layer with the glass spacers submerged therein is applied to a substrate with the glass spacers being in a uniform or a non-uniform pattern across the coating layer, wherein about 30% or less, about 20% or less, about 10% or less, or about 5% or less of the surface area of the coating layer has glass spacers submerged therein (i.e. the cavity or cavities contact about 70% or more, about 80% or more, about 90% or more, or about 95% or more of one or more of the inner surfaces of the substrates).

Figure 2:
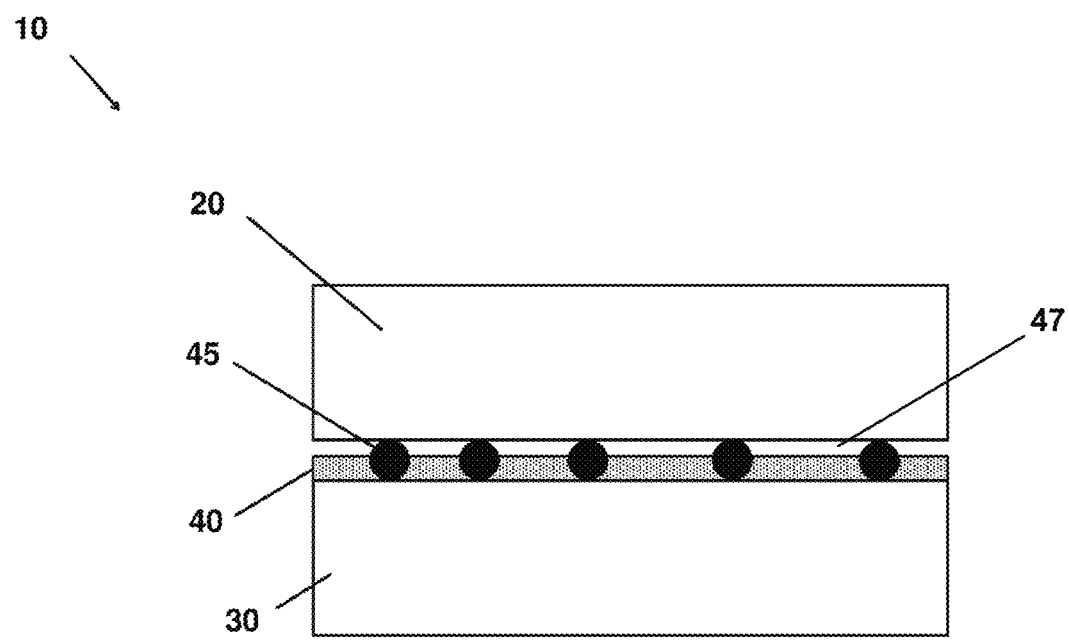
FIG. 2 is a schematic cross-section drawing of the laminate of the present disclosure.

FIG. 1 shows a plurality of glass spacers 45 submerged in the coating layer 40, on a substrate 30. FIG. 2 shows laminate 10 with upper substrate 20, lower substrate 30, coating layer 40, and spacers 45. At least one sealed cavity 47 of gas molecules is created in the empty space between coating layer 40, glass spacers 45, lower substrate 30, upper substrate 20 and the perimeter edges of the coating layer (not shown). In all embodiments, there may be one large sealed cavity 47 or a plurality of smaller sealed cavities 47 that contain the gas in the space between the substrates 20, 30 and around glass spacers 45. In addition, if glass spacers 45 are hollow, there would also be a second sealed cavity within each glass spacer 45 itself, but this sealed cavity differs from the sealed cavities 47 created between the substrates 20, 30 and around the glass spacers 45.

In some embodiments, the conductivity of the coating layer and/or glass spacers is about 5 W/(m·K) or less or about 3.5 W/(m·K) or less. In some embodiments, the conductivity of the coating layer and/or glass spacers is lower than the conductivity of the substrates that contact the coating composition. For purposes of the current disclosure, a "low conductive" coating layer and/or glass spacer has a conductivity of about 5 W/(m·K) or less and a "non-conductive" coating layer and/or glass spacer has a conductivity of 0 or about 0 W/(m·K).

The coating layer having the submerged glass spacers helps create an insulating layer between the substrates to minimize convective currents and reduce heat transfer between the substrates. In some embodiments, the coating layer is a low or non-conductive coating layer formed from a coating composition, such as for non-limiting example an enamel, a frit, or a combination thereof, comprising a ceramic compound, a glass compound or a combination thereof, optionally with other compounds, some of which may evaporate when curing the coating composition to form the coating layer. In certain embodiments, the ceramic and glass compounds in the coating layer have a similar composition and thermal expansion properties compared to the substrate that contacts the coating layer.

The coating composition may comprise a frit, which is a mixture of inorganic chemical substances produced by rapidly quenching a molten, complex combination of materials, and confining the chemical substances thus manufactured as non-migratory components of glassy solid flakes or granules. Frits include for non-limiting example all of the chemical substances specified below when they are intentionally manufactured in the production of the frit. The primary members include without limitation oxides of some or all of the elements listed below, where fluorides of these elements may also be included: aluminum, antimony, arsenic, barium, bismuth, boron, cadmium, calcium, cerium, chromium, cobalt, copper, gold, iron, lanthanum, lead, lithium, magnesium, manganese, molybdenum, neodymium, nickel, niobium, phosphorus, potassium, silicon, silver, sodium, strontium, tin, titanium, tungsten, vanadium, zinc, zirconium, and combinations thereof. The most common frits are bismuth and zinc based frits. The frits may comprise pigments added in small percentages for color purposes.

A non-limiting example of a suitable coating composition is:

Crystalline Silica: 11-15%
Borates: 19-22%
Zinc Oxide: 25-29%
Titanium Dioxide: 32-36%
Manganese Compound: 0-2%
Iron Oxide: 0-2%
Chromium Compound: 0-2%
Cobalt Compound: 0-3%
Alumina: 3-6%

Another non-limiting example of a suitable coating composition is:

Crystalline Silica: 34-38%
Borates: 8-12%
Zinc Oxide: 16-20%
Titanium Dioxide: 5-9%
Manganese Compound: 0-3%
Iron Oxide: 0-3%
Chromium Compound: 11-15%
Copper Compound: 8-12%

The glass spacers may be submerged in the coating composition before the coating composition is applied to a substrate. The coating layer with the glass spacers submerged therein may be applied to the substrate by silk screening or any other suitable technique. When silk screening for example, the coating composition with the glass spacers is injected through the screen and applied to the substrate so that the glass spacers are submerged within the coating layer. This arrangement helps produce at least one sealed cavity of gas molecules around the glass spacers and between the substrates or layers therebetween. The coating layer may be transparent or colored. Intermediate layers, additional substrates and additional coating layers may be present as desired.

The laminates may be formed by chemically bonding the coating layer to one or more of the substrates in any manner known to those skilled in the art. For a non-limiting example, the laminates may be formed by steps comprising applying the coating composition with the glass spacers to a first substrate, heating the coating composition to adhere the coating composition to the substrate, applying a second substrate on the heated coating composition, and firing the heated coating composition to form a chemical bond between the coating layer and one or more of the substrates. In other embodiments, the laminates are formed by steps comprising applying the coating composition with the glass spacers to a first substrate, applying a second substrate on the coating composition, then firing the coating composition to form a chemical bond between the coating layer and one or more of the substrates. In all embodiments, one or more of the coating layers, the first substrate, the second substrate and the glass spacers may form a chemical bond with the one or more of the others.

The coating layers of the disclosure, at least the coating layer that touches the substrate, is pyrolytic because the coating layer is chemically bonded to the substrate by sharing an oxygen atom and becoming part of the Si—O—X chain. Pyrolytic coatings are "hard" coatings and differ from "soft" coatings like paint that are mechanically adhered to a substrate. Pyrolytic coatings compared to adhered coatings have superior wear resistance, do not easily scratch off, and typically do not require protective topcoats. The pyrolytic coatings of the disclosure can be applied in any manner known to those skilled in the art, such as by deposition using a high temperature plasma process or silk screening.

The term "glass" as used herein includes glass and glass-ceramics, including but not limited to soda lime, borosilicate, lithium aluminosilicate, and combinations thereof. The term "substrate" signifies a platform to which the coatings described herein and other elements can be applied. The substrates are not limited in shape. The substrates may be flat, curved, concave or convex, and may have rectangular, square or other dimensions. In some embodiments, the substrate comprises a glass material and have a thickness of about 1 to about 10 mm or about 2 to about 5 mm.

In some embodiments, the coating layer has a thickness of about 0.010 inches or less, about 0.005 inches or less, or about 0.001 inches or less. This thickness refers to the coating layer itself, and not any glass spacers or portions thereof that may protrude from the top of the coating layer. It is desirable to form a coating layer having such a small thickness and to use a low or non-conductive coating composition to minimize conductive heat transfer. The coating layer at these small thicknesses in combination with the glass spacers helps produce one or more sealed three-dimensional cavities each having a very small volume with a small amount of gas molecules therein. The perimeter edges of the coating layer may have an increased thickness to help form the sealed cavity, for non-limiting example by using a high temperature epoxy, silicon or glue, each of which may form a mechanical bond with the substrates instead of a chemical bond. Since there is a small amount of gas molecules in each cavity, convective heat transfer between the substrates is minimized thereby minimizing heat loss through the laminates into the surrounding environment. The cavities essentially act as thermal insulators. The gas can be air or an inert gas. In some embodiments, there is a partial or complete vacuum in the cavities. In other embodiments, there is no vacuum.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure. The ranges disclosed herein include all subranges therebetween.

The invention claimed is:

1. A thermally insulating laminate comprising:
   a first glass substrate having an inner surface;
   a second glass substrate having an inner surface;
   a low- or non-conductive and cured coating layer on at least one of the inner surfaces of the first glass substrate and the second glass substrate, wherein the coating layer forms a chemical bond with at least one of the inner surfaces;
   a plurality of glass spacers, wherein each of the plurality of glass spacers has a portion of its height submerged within the coating layer, wherein the coating layer is on the at least one of the inner surfaces of the first glass substrate and the second glass substrate, and
   wherein the coating layer has a thickness of about 0.010 inches or less,
   wherein at least one sealed cavity of gas molecules is created between the substrates and around a portion of the glass spacers not submerged in the coating layer.

2. The laminate of claim 1, wherein the glass spacers comprise about 100 to about 700 spacers per square millimeter of the coating layer with a width of about 10 to about 50 microns.

3. The laminate of claim 1, wherein the thickness of the coating layer is about 0.005 inches or less.

4. The laminate of claim 1, wherein the thickness of the coating layer is about 0.001 inches or less.

5. The laminate of claim 1, wherein about 30% or less of the surface area of the coating layer has glass spacers submerged therein.

6. The laminate of claim 1, wherein the coating layer comprises an enamel, a frit, or a combination thereof, comprising a ceramic compound, a glass compound or a combination thereof.

7. The laminate of claim 1, wherein the coating layer is transparent.

8. The laminate of claim 1, wherein the coating layer has a conductivity lower than a conductivity of the first and second substrates.

9. The laminate of claim 1, wherein there is no vacuum in the cavities.

10. An oven comprising the laminate of claim 1, wherein the oven operates at a temperature above about 175° C.

11. The oven of claim 10, wherein a window or sight glass of the oven comprises the laminate.

12. The laminate of claim 1, wherein one-third or less of each of the plurality of glass spacers is submerged within the coating layer.

13. The laminate of claim 1, wherein the laminate comprises about 100 to about 700 glass spacers per square millimeter of the coating layer.

14. The laminate of claim 1, wherein the conductivity of the low- or non-conductive coating layer is about 5 W/(m·K) or less.

15. A method of forming the laminate of claim 1, comprising the steps of:
   applying a low- or non-conductive coating composition, with the glass spacers submerged therein, to the first substrate;
   heating the coating composition to adhere the coating composition to the first substrate, and so that the spacers are submerged in the coating composition on the first substrate;
   applying the second substrate on the heated coating composition; and
   firing the heated coating composition to form the low- or non-conductive and cured coating layer and the chemical bond.

16. A method of forming the laminate of claim 1, comprising the steps of:
   applying a low- or non-conductive coating composition, with the glass spacers submerged therein, to the first substrate, so that the spacers are submerged in the coating composition on the first substrate;
   applying the second substrate on the coating composition; and
   firing the coating composition to form the low- or non-conductive and cured coating layer and the chemical bond.

17. A thermally insulating laminate comprising:
a first glass substrate having an inner surface;
a second glass substrate having an inner surface;
a low- or non-conductive and cured coating layer on at least one of the inner surfaces of the first glass substrate and the second glass substrate, wherein the coating layer forms a chemical bond with at least one of the inner surfaces; and
a plurality of glass spacers, wherein each of the plurality of glass spacers has a portion of its height submerged within the coating layer, wherein the coating layer is on the at least one of the inner surfaces of the first glass substrate and the second glass substrate, wherein the portion is one-third or less of each of the plurality of glass spacers,
wherein at least one sealed cavity of gas molecules is created between the substrates and around a portion of the glass spacers not submerged in the coating layer.

18. The laminate of claim 17, wherein the coating layer has a thickness of about 0.010 inches or less.

19. The laminate of claim 17, wherein the laminate comprises about 100 to about 700 glass spacers per square millimeter of the coating layer.

20. A thermally insulating laminate comprising:
a first glass substrate having an inner surface;
a second glass substrate having an inner surface;
a low- or non-conductive and cured coating layer that forms a chemical bond with at least one of the inner surfaces; and
a plurality of glass spacers, wherein each of the plurality of glass spacers has a portion of its height submerged within the coating layer, wherein the coating layer is on the at least one of the inner surfaces of the first glass substrate and the second glass substrate,
wherein a portion of the plurality of glass spacers that is not submerged in the coating layer contacts either the first glass substrate or the second glass substrate, and
wherein at least one sealed cavity of gas molecules is created between the substrates and around a portion of the glass spacers not submerged in the coating layer.

21. The laminate of claim 20, wherein the coating layer is on at least one of the inner surfaces of the first glass substrate and the second glass substrate.

22. The laminate of claim 20, wherein the coating layer has a thickness of about 0.010 inches or less.

23. The laminate of claim 20, wherein one-third or less of each of the plurality of glass spacers is submerged within the coating layer.

24. The laminate of claim 20, wherein the laminate comprises about 100 to about 700 glass spacers per square millimeter of the coating layer.

25. A thermally insulating laminate comprising:
a first glass substrate having an inner surface;
a second glass substrate;
a low or non-conductive pyrolytic coating layer on the inner surface of the first glass substrate, wherein the coating layer forms a chemical bond with at least one of the inner surfaces; and
a plurality of glass spacers submerged in the coating layer, so that the plurality of glass spacers do not move with respect to the first glass substrate,
wherein the coating layer has a thickness of about 0.010 inches or less,
wherein at least one sealed cavity of gas molecules is created between the substrates and around a portion of the glass spacers not submerged in the coating layer.

26. The laminate of claim 25, wherein the glass spacers comprise about 100 to about 700 spacers per square millimeter of the coating layer with a width of about 10 to about 50 microns.

27. The laminate of claim 25, wherein the thickness of the coating layer is about 0.005 inches or less.

* * * * *